United States Patent
Shimoaka et al.

(10) Patent No.: US 12,397,484 B2
(45) Date of Patent: Aug. 26, 2025

(54) RESIN INTRUSION PREVENTION STRUCTURE, INJECTION DEVICE, AND INJECTION MOLDING MACHINE

(71) Applicant: THE JAPAN STEEL WORKS, LTD., Tokyo (JP)

(72) Inventors: Yousuke Shimoaka, Tokyo (JP); Kiyotaka Nakayama, Tokyo (JP); Masahiko Taketani, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 295 days.

(21) Appl. No.: 18/194,944

(22) Filed: Apr. 3, 2023

(65) Prior Publication Data

US 2023/0311384 A1 Oct. 5, 2023

(30) Foreign Application Priority Data

Apr. 5, 2022 (JP) ................................ 2022-062999

(51) Int. Cl.
*B29C 45/27* (2006.01)
*B29C 45/23* (2006.01)

(52) U.S. Cl.
CPC ............ *B29C 45/231* (2013.01); *B29C 45/27* (2013.01); *B29C 2045/2777* (2013.01); *B29C 2945/76147* (2013.01); *B29C 2945/7621* (2013.01); *B29C 2945/76464* (2013.01)

(58) Field of Classification Search
CPC ....... B29C 45/23; B29C 45/231; B29C 45/27; B29C 45/2725; B29C 45/1774; B29C 45/80; B29C 45/322; B29C 45/54; B29C 45/76

See application file for complete search history.

(56) References Cited

U.S. PATENT DOCUMENTS

| 2011/0229597 A1* | 9/2011 | Brelski | B29C 45/52 |
| | | | 425/562 |
| 2017/0066172 A1* | 3/2017 | Nagano | B29C 45/80 |

FOREIGN PATENT DOCUMENTS

| JP | 3-274125 A | 12/1991 |
| JP | 3336268 B2 * | 10/2002 |

* cited by examiner

*Primary Examiner* — Thu Khanh T. Nguyen
(74) *Attorney, Agent, or Firm* — Sughrue Mion, PLLC (57) ABSTRACT

A resin intrusion prevention structure for preventing resin intrusion into a heater in a shut-off nozzle, the shut-off nozzle including a nozzle body having an injection flow path, through which resin flows, in an axial direction and a shut-off valve configured to open and block the injection flow path. The resin intrusion prevention structure is provided in a vicinity of a sliding exposed portion, which is exposed to an outer circumferential surface of the nozzle body in a sliding portion, and is configured to prevent the resin leaking from the sliding exposed portion from intruding into the heater provided in the shut-off nozzle.

20 Claims, 7 Drawing Sheets

RESIN INTRUSION PREVENTION STRUCTURE, INJECTION DEVICE, AND INJECTION MOLDING MACHINE

CROSS-REFERENCE TO RELATED APPLICATIONS

This application is based on and claims priority under 35 USC 119 from Japanese Patent Application No. 2022-062999 filed on Apr. 5, 2022, the entire content of which is incorporated herein by reference.

TECHNICAL FIELD

The present disclosure relates to a resin intrusion prevention structure for preventing resin from intruding into a heater in a shut-off nozzle, an injection device having the resin intrusion prevention structure, and an injection molding machine.

BACKGROUND

A shut-off nozzle provided in an injection device of an injection molding machine can open and block an injection flow path through which resin of an injection nozzle flows and prevent so-called flapping. There are various types of shut-off nozzles, and an example thereof includes one described in JPH3-274125A. A shut-off nozzle of this type includes a nozzle body and a needle valve provided obliquely to the nozzle body. The nozzle body has an oblique hole, that is, a needle hole, which extends from an outer circumferential surface of the nozzle body to an injection flow path in the nozzle body. The needle valve is inserted into the needle hole so as to be movable forward and backward. When the needle valve is moved forward, the injection flow path is blocked, and when the needle valve is moved backward, the injection flow path is opened.

SUMMARY

Since the needle valve slides relative to the needle hole, resin may slightly leak from a sliding portion thereof. Although the amount of resin leaking from the sliding portion is small, the amount of resin leaking increases when operation continues for a long period of time. The leaked resin may flow into a heater provided in the nozzle body. The nozzle body is used in a state of being inserted into a mold plate, and thus it is not possible to visually recognize from outside whether the leaked resin reaches the heater. When the resin reaches the heater, the resin may cause a failure of the heater and a failure in detaching the heater.

Illustrative aspects of the present disclosure provide a resin intrusion prevention structure that prevents resin from intruding into a heater in a shut-off nozzle.

Other problems and novel features will become apparent from the description of this specification and the accompanying drawings.

The shut-off nozzle includes a nozzle body and a shut-off valve. The nozzle body has an injection flow path in an axial direction through which resin flows. The shut-off valve is configured to open and block the injection flow path. The nozzle body includes a sliding exposed portion exposed to an outer circumferential surface of the nozzle body in a sliding portion between a drive member that drives the shut-off valve and the nozzle body. The present disclosure provides a resin intrusion prevention structure for preventing resin intrusion into a heater, the resin intrusion prevention structure being provided in a vicinity of the sliding exposed portion and preventing resin leaking from the sliding exposed portion from intruding into the heater provided in the shut-off nozzle.

According to the present disclosure, resin leaking from the sliding exposed portion in the shut-off nozzle can be prevented from reaching the heater.

DETAILED DESCRIPTION

Hereinafter, illustrative embodiments will be described in detail with reference to the drawings. The present invention is not limited to the following illustrative embodiments. To clarify the description, the following description and the drawings are simplified appropriately. In the drawings, the same elements are denoted by the same reference numerals, and repeated description thereof is omitted as necessary. Hatching may be omitted to avoid complicating the drawings.

An illustrative embodiment will be described.
{Injection Molding Machine}

Figure 1:
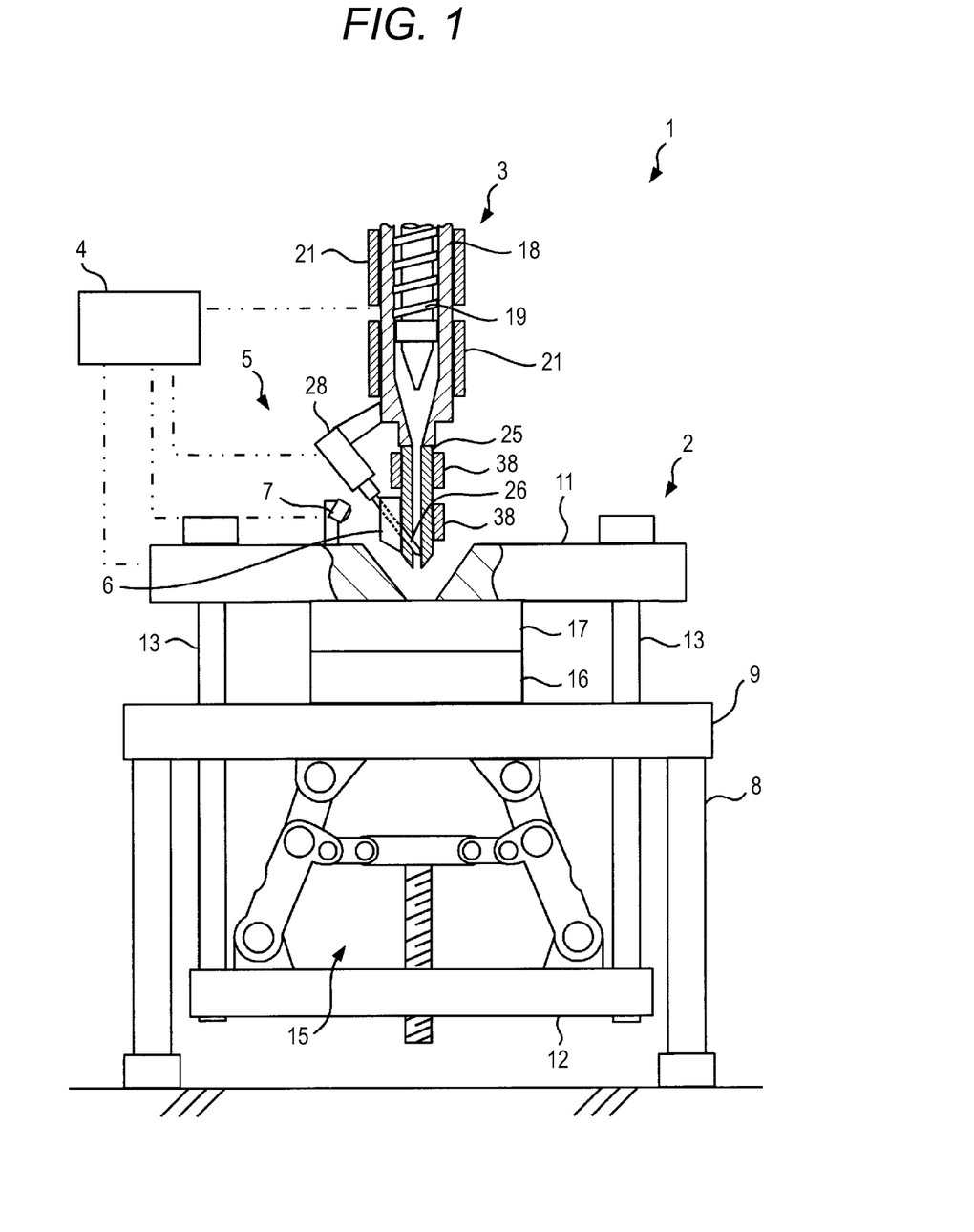
FIG. 1 is a front view showing an injection molding machine according to an illustrative embodiment.

As shown in FIG. 1, an injection molding machine 1 according to the present illustrative embodiment is a vertical injection molding machine. The injection molding machine 1 is provided with a shut-off nozzle 5 and a resin intrusion prevention structure 6 for preventing resin intrusion into heater according to the present illustrative embodiment, which will be described later. Alternatively, the shut-off nozzle 5 and the resin intrusion prevention structure 6 may also be provided in a horizontal injection molding machine. That is, in carrying out the present invention, the same effects can be achieved by any type of injection molding machine regardless of the type. Hereinafter, the present illustrative embodiment will be described with reference to a vertical injection molding machine.

The injection molding machine 1 according to the present illustrative embodiment includes a toggle-type mold clamping device 2 and an injection device 3. The injection device 3 is provided with the shut-off nozzle 5 according to the present illustrative embodiment. The shut-off nozzle 5 is provided with the resin intrusion prevention structure 6 according to the present illustrative embodiment. The injection molding machine 1 is provided with a camera 7 in the vicinity of the shut-off nozzle 5. The injection molding machine 1 is provided with a control device 4. The mold clamping device 2, the injection device 3, the shut-off nozzle 5, the camera 7, and the like are connected to and controlled by the control device 4.

{Mold Clamping Device}

The mold clamping device 2 includes a housing 8, a fixed platen 9 fixed to the housing 8, an upper movable platen 11 provided above the fixed platen 9, and a lower movable platen 12 provided below the fixed platen 9. The upper movable platen 11 and the lower movable platen 12 are coupled by plural, for example, three, tie bars 13, 13, . . . . The fixed platen 9 penetrates the tie bars 13, 13 . . . . A mold clamping mechanism is provided between the lower movable platen 12 and the fixed platen 9. In the present illustrative embodiment, a toggle mechanism 15 is provided between the lower movable platen 12 and the fixed platen 9. The fixed platen 9 and the upper movable platen 11 are provided with a lower mold 16 and an upper mold 17, respectively. Therefore, when the toggle mechanism 15 is driven, the molds 16 and 17 are opened and closed.

{Injection Device}

The injection device 3 is supported by the upper movable platen 11. The injection device 3 is configured to move up and down integrally with the upper movable platen 11 when the upper movable platen 11 moves up and down by mold opening and closing. Incidentally, a support structure of the injection device is omitted in FIG. 1. The injection device 3 includes a heating cylinder 18 and a screw 19. The screw 19 is provided in the heating cylinder 18. The screw 19 is driven in a rotation direction and an axial direction by a screw drive device that is not shown in FIG. 1. The heating cylinder 18 is provided with heaters 21 and 21. The shut-off nozzle 5 according to the present illustrative embodiment described below is disposed at a distal end of the heating cylinder 18. When the heating cylinder 18 is heated and is supplied with resin and the screw 19 is rotated, the resin is melted and measured. By driving the screw 19 in the axial direction, the resin is injected into the molds 16 and 17.

{Shut-Off Nozzle}

Figure 2:
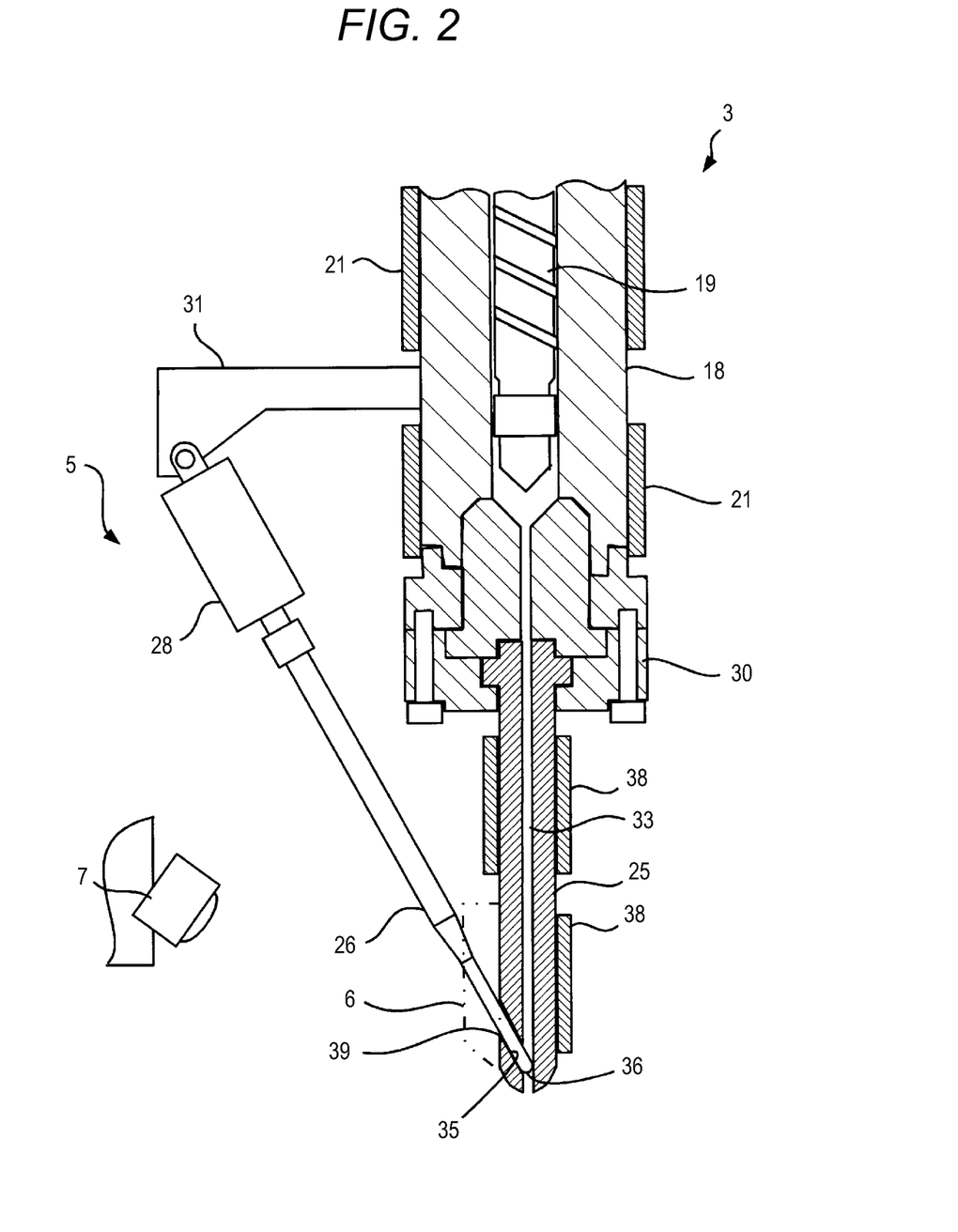
FIG. 2 is a front sectional view showing a shut-off nozzle and a part of an injection device according to the illustrative embodiment.

As shown in FIG. 2, the shut-off nozzle 5 according to the present illustrative embodiment includes a nozzle body 25, a needle valve 26 that is a shut-off valve, and a needle valve drive unit 28 that is configured to drive the needle valve 26. The nozzle body 25 is provided to the heating cylinder 18 via an adapter 30. The needle valve drive unit 28 is supported by a bracket 31 that is fixed to the heating cylinder 18.

The nozzle body 25 has a flow path, in which resin flows. That is, an injection flow path 33 is formed in the nozzle body 25. The injection flow path 33 is provided at an axial center of the nozzle body 25. That is, the injection flow path 33 is formed inside the nozzle body 25 in the axial direction. The nozzle body 25 has an oblique hole that reaches the injection flow path 33 from an outer circumferential surface thereof. That is, a needle hole 35 is formed in the outer circumferential surface of the nozzle body 25. The needle valve 26 is inserted into the needle hole 35 so as to be movable forward and backward.

The needle valve 26 is moved forward and backward by the needle valve drive unit 28. When the needle valve 26 moves forward, a head portion 36 thereof blocks the injection flow path 33. That is, the shut-off nozzle 5 is blocked, and no resin flows. On the other hand, when the needle valve 26 retreats, the head portion 36 retreats from the injection flow path 33. That is, the injection flow path 33 is opened so that the resin flows. In this way, the needle valve 26, which is a shut-off valve, has the head portion 36 as a valve body. The needle valve 26 can be said to be a drive member configured to drive the head portion 36 that is the valve body.

The nozzle body 25 is provided with heaters 38 and 38. The heaters 38 and 38 are disposed on a circumferential surface of the nozzle body 25. Thus, the resin in the injection flow path 33 is controlled to a desired temperature.

The needle valve 26 slides relative to the nozzle body 25. That is, the needle hole 35 is a sliding portion in the nozzle body 25. In the sliding portion, a part exposed to the outside is referred to as a sliding exposed portion 39 in the present specification. Although a gap in the sliding portion is small, a part of resin flowing through the injection flow path 33 may leak to the outside from the sliding exposed portion 39 through the gap. Specifically, when the needle valve 26 is driven to move forward and backward, leakage of the part of resin is likely to occur along with the needle valve 26. In the present illustrative embodiment, the resin intrusion prevention structure 6 according to the present illustrative embodiment is provided such that the resin leaked from the sliding exposed portion 39 does not intrude into the heaters 38 and 38. In FIG. 2, the resin intrusion prevention structure 6 is indicated by a two-dot chain line.

{Resin Intrusion Prevention Structure for Preventing Resin Intrusion into Heater}

Figure 3:
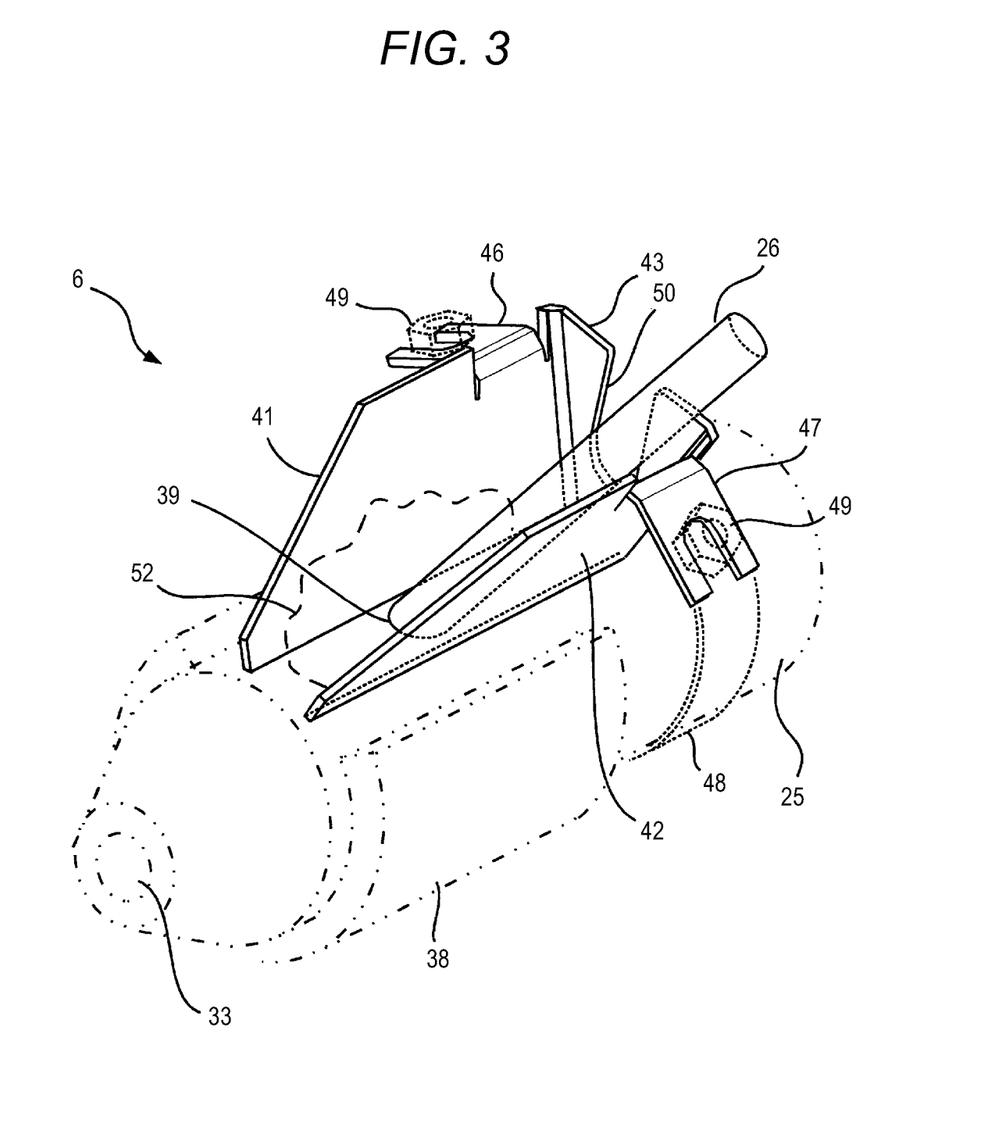
FIG. 3 is a perspective view showing a resin intrusion prevention structure according to the illustrative embodiment.

FIG. 3 shows the resin intrusion prevention structure 6 for preventing resin intrusion into heater according to a first illustrative embodiment. The resin intrusion prevention structure 6 is formed of a metal plate. The resin intrusion prevention structure 6 includes a pair of walls surrounding the sliding exposed portion 39 from two sides, that is, first and second resin outflow preventing walls 41 and 42, and a third resin outflow preventing wall 43 connecting the first and second resin outflow preventing walls 41 and 42. The first and second resin outflow preventing walls 41 and 42 are disposed to surround the sliding exposed portion 39 from two sides in the circumferential direction of the nozzle body 25. The first and second resin outflow preventing walls 41 and 42 are interposed between the sliding exposed portion 39 and the heater 38. The first to third resin outflow preventing walls 41, 42, and 43 surround the sliding exposed portion 39 from three sides. End portions of the first to third resin outflow preventing walls 41, 42, and 43 are in close contact with the outer circumferential surface of the nozzle body 25.

The first and second resin outflow preventing walls 41 and 42 are provided with fixing portions 46 and 47 bent outward, respectively. The resin intrusion prevention structure 6 according to the first illustrative embodiment is fixed to the nozzle body 25 by a fixing band 48, which is a dedicated member. The fixing band 48 is made of metal. That is, although not shown in the drawings, male screws are attached to two end portions of the fixing band 48, and the male screws are coupled to the fixing portions 46 and 47 and fixed by nuts 49 and 49. The third resin outflow preventing wall 43 has, in a central portion, a cutout portion 50 having a predetermined width and a predetermined length. The needle valve 26 is inserted into the cutout portion 50.

As described above, the end portions of the first to third resin outflow preventing walls 41, 42, and 43 are in close contact with the outer circumferential surface of the nozzle body 25. Therefore, even when resin 52 leaks from the sliding exposed portion 39, the resin 52 is blocked by the first to third resin outflow preventing walls 41, 42, and 43. That is, the resin 52 is prevented from intruding into the heater 38. Accordingly, the heater 38 is protected.

In the resin intrusion prevention structure 6, the amount of the resin 52 leaking from the sliding exposed portion 39 may increase due to operation for a long time. In the present illustrative embodiment, the camera 7 (see FIGS. 1 and 2) monitors the resin intrusion prevention structure 6.

{Method for Determining Cleaning Timing and Replacement Timing for Shut-Off Nozzle}

A method for determining a cleaning timing and a replacement timing for the shut-off nozzle according to the present illustrative embodiment will be described. The control device 4 (see FIG. 1) performs a process shown in FIG. 4 each time a molding cycle is completed. First, step S01 is performed, and the resin intrusion prevention structure 6 according to the present illustrative embodiment is imaged by the camera 7. Then, the amount of resin accumulating in the resin intrusion prevention structure 6 is estimated from the captured image. There are various methods for estimating the amount of resin. For example, the control device 4 (FIG. 1) compares an image when there is no resin leakage with a current image and searches for a part where the luminance changes. The amount of resin is estimated based on the size of the changing part.

Figure 4:
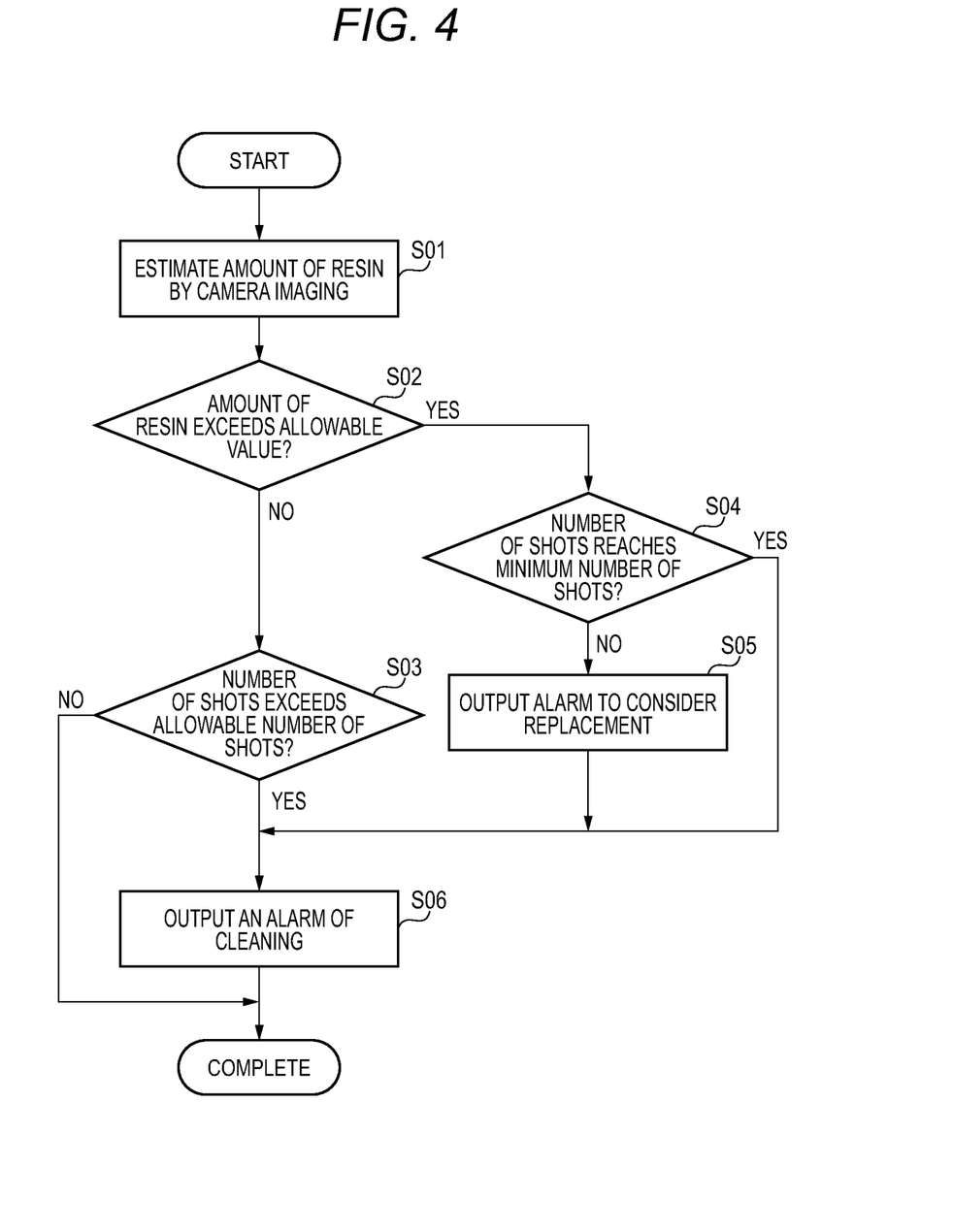
FIG. 4 is a flowchart showing a method for determining a cleaning timing and a replacement timing for the shut-off nozzle according to the illustrative embodiment.

The control device 4 performs step S02. That is, the control device 4 determines whether the amount of resin, accumulated in the resin intrusion prevention structure 6, exceeds an allowable value. The allowable value is set in the control device 4. Such allowable value is compared with the amount of resin. When the amount of resin does not exceed the allowable amount, the process proceeds to step S03. On the other hand, when the amount of resin exceeds the allowable amount, the process proceeds to step S04.

In step S03, the control device 4 checks the number of shots. The number of shots is a cumulative number of times of injections performed in the injection device 3, and is a cumulative number of molding cycles. When the number of shots does not exceed an allowable number of shots set in advance in the control device 4, the process is completed. On the other hand, when the number of shots exceeds the allowable number of shots, the process proceeds to step S06. The control device 4 outputs an alarm prompting cleaning of the shut-off nozzle 5 and the resin intrusion prevention structure 6. After the alarm is output, the process is completed. An operator cleans the shut-off nozzle 5 and the resin intrusion prevention structure 6. After the cleaning, the number of shots recorded in the control device 4 is reset to zero by operation of the operator.

When it is determined in step S02 that the amount of resin exceeds the allowable value, the process proceeds to step S04 as described above. The control device 4 checks whether the number of shots reaches a minimum number of shots. The minimum number of shots is set in advance in the control device 4. When the number of shots reaches the minimum number of shots in step S04, the process proceeds to step S06. On the other hand, when the number of shots does not reach the minimum number of shots, the control device 4 performs step S05 and outputs an alarm to consider replacement of the shut-off nozzle 5. This is because wear of the shut-off nozzle 5 is suspected. The operator determines whether the shut-off nozzle 5 is to be replaced. After the alarm is output, the process proceeds to step S06. The processing in step S06 is as described above, and the number of shots recorded in the control device 4 is reset to zero as described above after the operator performs cleaning. The process is completed.

MODIFICATIONS TO ILLUSTRATIVE EMBODIMENT

Figure 5A:
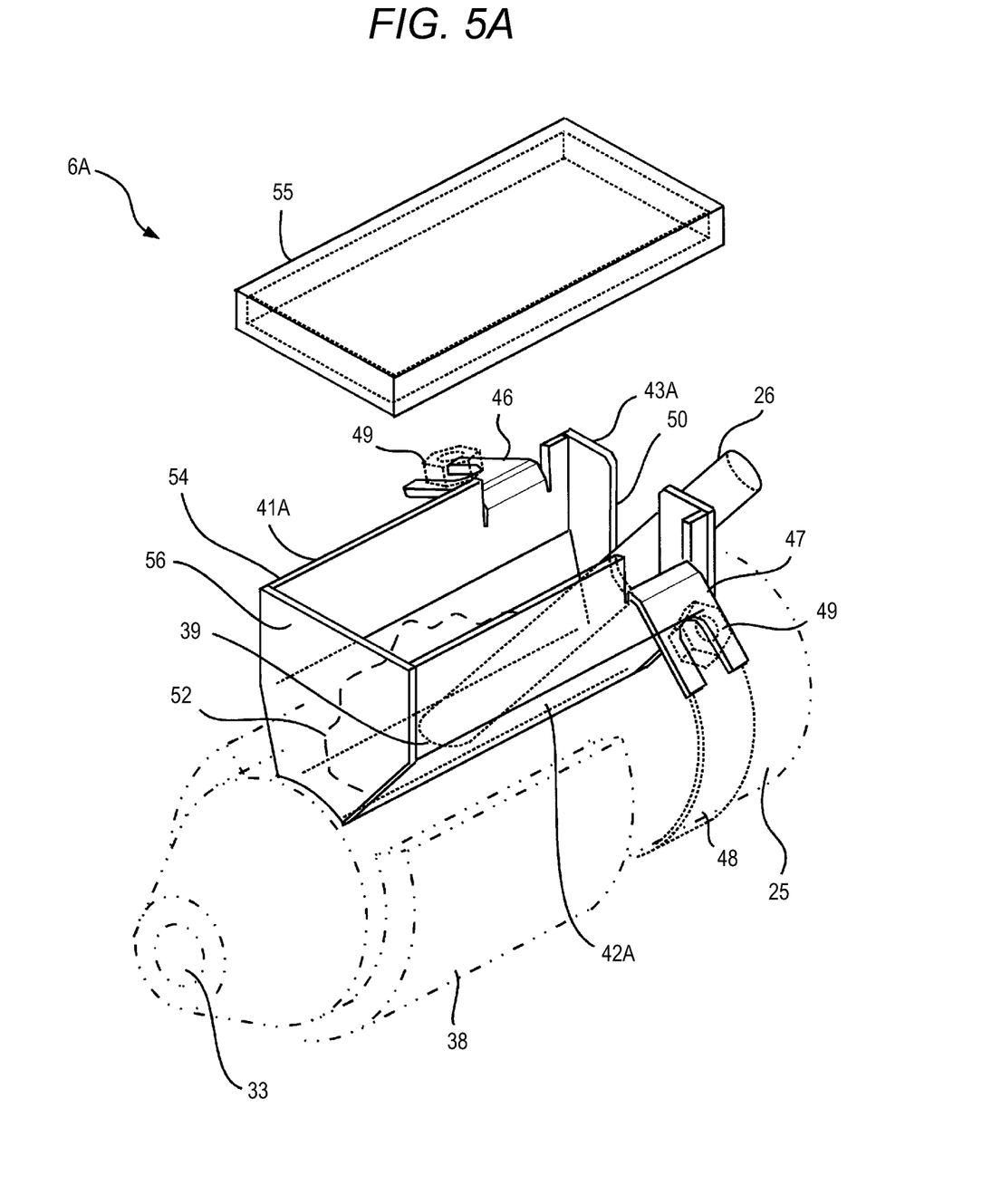
FIG. 5A is a perspective view showing a resin intrusion prevention structure according to a second illustrative embodiment.

Various modifications can be made to the present illustrative embodiment. FIG. 5A shows a resin intrusion prevention structure 6A for preventing resin intrusion into heater according to a second illustrative embodiment. In this illustrative embodiment, the resin intrusion prevention structure 6A includes a body portion 54 and a lid 55. The body portion 54 is slightly different in shape from the resin intrusion prevention structure 6 according to the first illustrative embodiment. First to third resin outflow preventing walls 41A, 42A, and 43A have slightly increased heights as compared to those of the first illustrative embodiment. That is, a relatively large amount of the resin 52 can accumulate. For example, the resin intrusion prevention structure 6A according to the second illustrative embodiment can store a larger amount of the resin 52 as compared to the resin intrusion prevention structure 6 of the first illustrative embodiment. The body portion 54 further includes a fourth resin outflow preventing wall 56 connecting the first and second resin outflow preventing walls 41A and 42A. The lid 55 completely blocks an opening defined by the first to fourth resin outflow preventing walls 41A, 42A, 43A, and 56. That is, the resin intrusion prevention structure 6A can also be said to be a sliding exposed portion cover that substantially completely covers the sliding exposed portion 39, so that it can prevent the resin 52 from scattering to the outside.

Figure 5B:
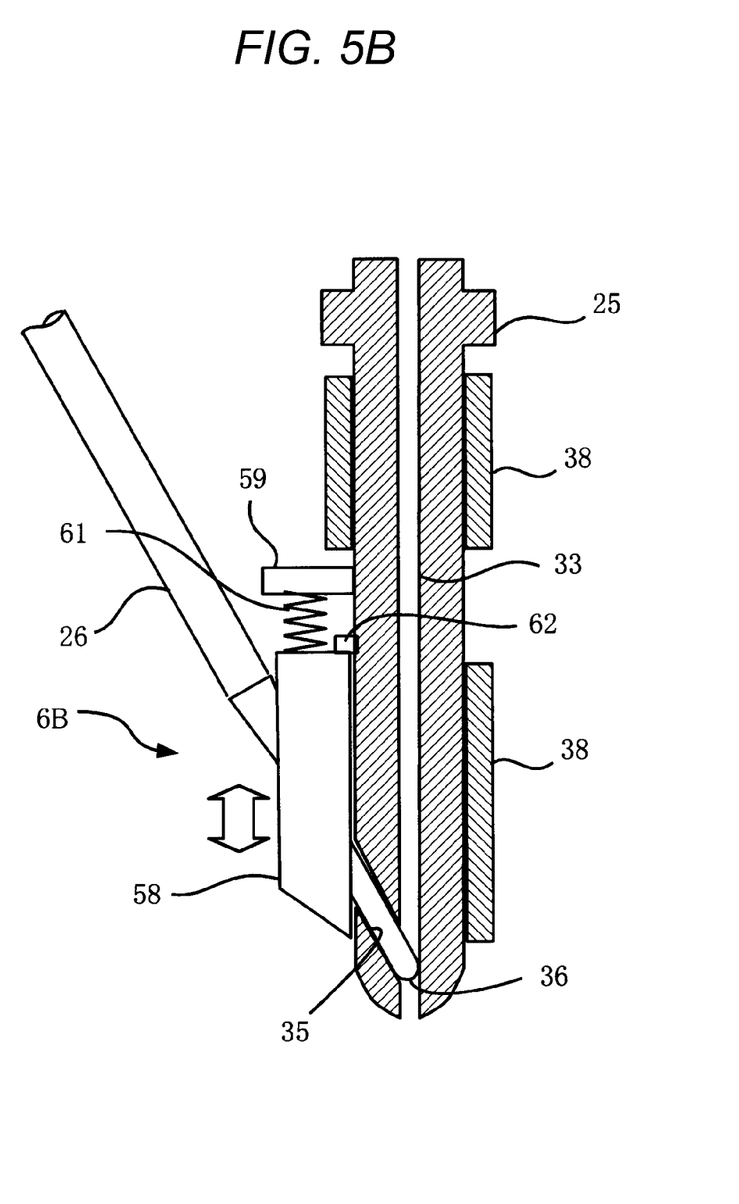
FIG. 5B is a front sectional view showing a resin intrusion prevention structure according to a third illustrative embodiment and a part of a shut-off nozzle.

FIG. 5B shows a resin intrusion prevention structure 6B for preventing resin intrusion into heater according to a third illustrative embodiment. The resin intrusion prevention structure 6B includes a body portion 58, a fixed portion 59, and a spring 61. The body portion 58 accumulates resin. The fixed portion 59 is fixed to the nozzle body 25. The spring 61 couples the fixed portion 59 and the body portion 58. The body portion 58 slides downward when resin accumulates in the body portion 58, and the spring 61 extends according to the amount of resin. In this illustrative embodiment, a limit switch 62 is provided. The amount of resin accumulating in the body portion 58 is detected by the limit switch 62 when becoming equal to or larger than a certain amount. That is, the limit switch 62 is a detection mechanism configured to detect the weight of resin. The limit switch 62 is connected to the control device 4, so that the control device 4 is configured to determine whether to clean the shut-off nozzle 5 and the resin intrusion prevention structure 6B.

Figure 5C:
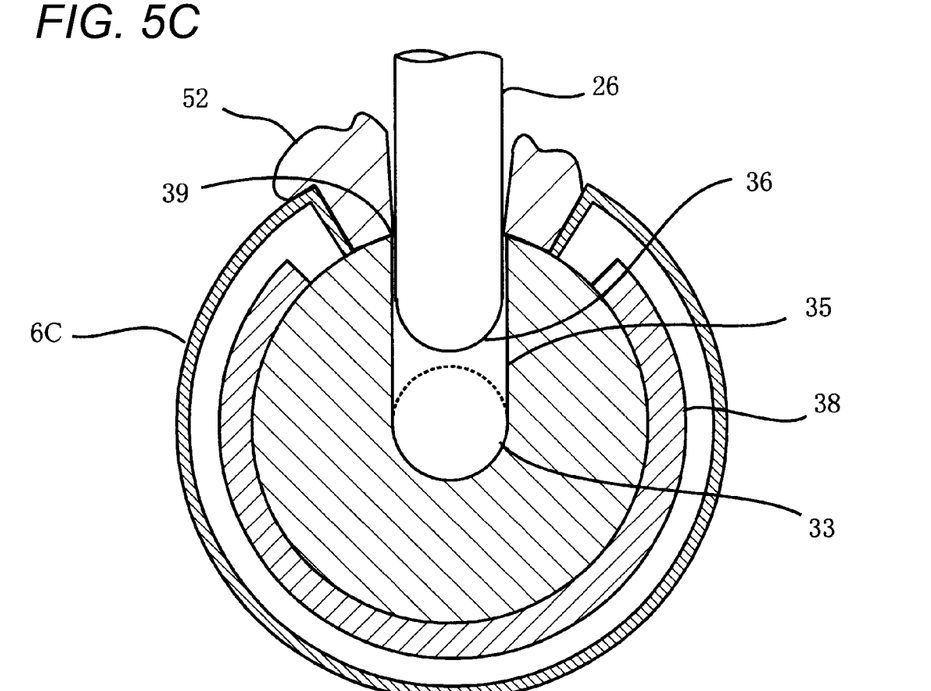
FIG. 5C is a side sectional view showing a resin intrusion prevention structure according to a fourth illustrative embodiment and a part of a shut-off nozzle.

FIG. 5C shows a resin intrusion prevention structure 6C according to a fourth illustrative embodiment. The resin intrusion prevention structure 6C is a heater cover that covers the heater 38. Also in this illustrative embodiment, the resin intrusion prevention structure 6C prevents the resin 52 leaking from the sliding exposed portion 39 from intruding into the heater 38.

Figure 5D:
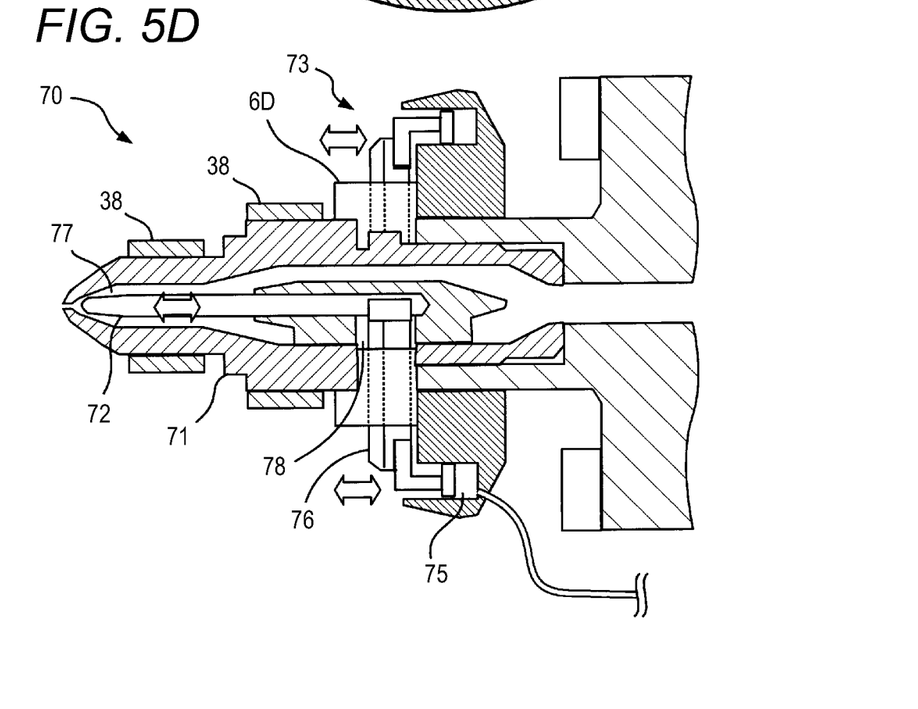
FIG. 5D is a front sectional view showing a part of an injection device, a shut-off nozzle according to another illustrative embodiment, and a resin intrusion prevention structure according to a fifth illustrative embodiment provided in the shut-off nozzle.

FIG. 5D shows a shut-off nozzle 70 according to a different illustrative embodiment, and a resin intrusion prevention structure 6D for preventing resin intrusion into heater according to a fifth illustrative embodiment that is provided in the shut-off nozzle 70. The shut-off nozzle 70 is also configured by a nozzle body 71, a needle valve 72, and a needle valve drive unit 73. However, unlike the shut-off nozzle 5 according to the first illustrative embodiment, the needle valve 72 is coaxial with the nozzle body 71.

The needle valve drive unit 73 includes a cylinder structure 75 driven by air, and a spring receiver 76 connected to the cylinder structure 75. The spring receiver 76 is connected to a rear end portion of the needle valve 72. When air is supplied to the cylinder structure 75, the spring receiver 76 is pressed, whereby the needle valve 72 is driven forward. That is, an injection flow path 77 in the nozzle body 71 is blocked. On the other hand, when the supply of air to the cylinder structure 75 is stopped, the spring receiver 76 retreats. That is, the needle valve 72 retreats, and the injection flow path 77 is opened.

In the shut-off nozzle 70, a sliding exposed portion 78 is a gap around the spring receiver 76. The resin intrusion prevention structure 6D according to the fifth illustrative embodiment is a cover that covers the sliding exposed portion 78. Therefore, even when resin leaks from the sliding exposed portion 78, the resin does not leak from the resin intrusion prevention structure 6D, so that it is possible to prevent the resin from intruding into the heaters 38 and 38.

The resin intrusion prevention structure 6 according to the present illustrative embodiment can be implemented even when the shut-off valve is a shut-off nozzle including a rotary valve. Even in the shut-off nozzle including a rotary valve, a sliding portion is to be present between a drive member and a nozzle body when the rotary valve is driven, and a part where the sliding portion is exposed to the outside becomes a sliding exposed portion. The resin intrusion prevention structure may be provided in the vicinity of the sliding exposed portion. According thereto, a heater provided in the nozzle body can be protected from the intrusion of resin.

Although the present invention made by the present inventor is specifically described based on the illustrative embodiments, it is needless to say that the present invention is not limited to the illustrative embodiments described above, and that various modifications can be made without departing from the scope of the present invention. Plural examples described above can be implemented in combination appropriately.

What is claimed is:

1. A resin intrusion prevention structure for preventing resin intrusion into a heater in a shut-off nozzle, the shut-off nozzle comprising a nozzle body having an injection flow path, through which resin flows, in an axial direction and a shut-off valve configured to open and block the injection flow path,
wherein the resin intrusion prevention structure is configured to prevent the resin leaking from a sliding exposed portion of the shut-off nozzle from intruding into the heater, the sliding exposed portion being exposed to an outer circumferential surface of the nozzle body in a sliding portion between the nozzle body and a drive member, the drive member being configured to drive the shut-off valve.

2. The resin intrusion prevention structure according to claim 1, wherein the shut-off valve is a needle valve.

3. The resin intrusion prevention structure according to claim 2,
wherein the needle valve is slidably provided in a needle hole opened to reach the injection flow path from the outer circumferential surface of the nozzle body,
wherein the drive member is the needle valve, and
wherein the sliding exposed portion is an opening part of the needle hole.

4. The resin intrusion prevention structure according to claim 1, wherein the resin intrusion prevention structure comprises a resin outflow preventing wall that is disposed on the outer circumferential surface of the nozzle body between the sliding exposed portion and the heater to block a flow path of the resin leaked from the sliding exposed portion toward the heater.

5. The resin intrusion prevention structure according to claim 1, wherein the resin intrusion prevention structure comprises a sliding exposed portion cover that covers the sliding exposed portion, and the resin leaked from the sliding exposed portion accumulates in the sliding exposed portion cover.

6. The resin intrusion prevention structure according to claim 1, wherein the resin intrusion prevention structure further comprises a heater cover that covers the heater.

7. The resin intrusion prevention structure according to claim 1, wherein the resin intrusion prevention structure further comprises a detection mechanism configured to detect a weight of the resin leaked from the sliding exposed portion.

8. An injection device comprising:
a control device;
a heating cylinder;
a screw disposed in the heating cylinder;
a shut-off nozzle provided to the heating cylinder;
a heater provided in the shut-off nozzle; and
a resin intrusion prevention structure for preventing resin intrusion into the heater provided in the shut-off nozzle,
wherein the shut-off nozzle comprises:
a nozzle body having an injection flow path, through which the resin flows, in an axial direction; and
a shut-off valve configured to open and block the injection flow path, and
wherein the resin intrusion prevention structure is configured to prevent the resin leaking from a sliding exposed portion of the shut-off nozzle from intruding into the heater, the sliding exposed portion being exposed to an outer circumferential surface of the nozzle body in a sliding portion between the nozzle body and a drive member, the drive member being configured to drive the shut-off valve and the nozzle body.

9. The injection device according to claim 8, wherein the shut-off valve is a needle valve.

10. The injection device according to claim 9,
wherein the needle valve is slidably provided in a needle hole opened to reach the injection flow path from the outer circumferential surface of the nozzle body,
wherein the drive member is the needle valve, and
wherein the sliding exposed portion is an opening part of the needle hole.

11. The injection device according to claim 8, wherein the resin intrusion prevention structure comprises a resin outflow preventing wall that is disposed on the outer circumferential surface of the nozzle body between the sliding exposed portion and the heater to block a flow path of the resin leaked from the sliding exposed portion toward the heater.

12. The injection device according to claim 8, wherein the resin intrusion prevention structure further comprises a sliding exposed portion cover that covers the sliding exposed portion, and the resin leaked from the sliding exposed portion accumulates in the sliding exposed portion cover.

13. The injection device according to claim 8, wherein the resin intrusion prevention structure further comprises a heater cover that covers the heater.

14. The injection device according to claim 8, wherein the resin intrusion prevention structure further comprises a detection mechanism configured to detect a weight of the resin leaked from the sliding exposed portion.

15. The injection device according to claim 8,
wherein the injection device comprises a camera, and
wherein the control device is configured to monitor an amount of the resin accumulated in the resin intrusion prevention structure from an image imaged by the camera.

16. The injection device according to claim 15, wherein the control device is further configured to output an alarm indicating that cleaning is necessary based on determining that the amount of the resin accumulated in the resin intrusion prevention structure exceeds an allowable amount.

17. The injection device according to claim 15, wherein the control device is further configured to:
obtain a cumulative number of shots that is a cumulative number of shots performed in the injection device; and
output an alarm prompting replacement of the shut-off valve in a case the amount of the resin accumulated in the resin intrusion prevention structure exceeds an allowable amount and the cumulative number of shots exceeds an allowable number of shots.

18. An injection molding machine comprising:
an injection device configured to inject resin;
a mold clamping device configured to clamp a mold; and
a control device,
wherein the injection device comprises:
a heating cylinder;
a shut-off nozzle provided to the heating cylinder;
a screw disposed in the heating cylinder;
a heater provided in the shut-off nozzle; and
a resin intrusion prevention structure for preventing resin intrusion into the heater provided in the shut-off nozzle,
wherein the shut-off nozzle comprises:
a nozzle body having an injection flow path, through which the resin flows, in an axial direction; and
a shut-off valve configured to open and block the injection flow path,
wherein the resin intrusion prevention structure is configured to prevent the resin leaking from a sliding exposed portion of the shut-off nozzle from intruding into the heater, the sliding exposed portion being exposed to an outer circumferential surface of the nozzle body in a sliding portion between the nozzle body and a drive member, the drive member being configured to drive the shut-off valve.

19. The injection molding machine according to claim 18,
wherein the shut-off valve is a needle valve, and
wherein the resin intrusion prevention structure is disposed to surround the sliding exposed portion from at least both sides of the sliding exposed portion in a circumferential direction of the nozzle body and is configured to store the resin leaked from the sliding exposed portion.

20. The injection molding machine according to claim 18, wherein the resin intrusion prevention structure comprises a resin outflow preventing wall that is disposed on the outer circumferential surface of the nozzle body between the sliding exposed portion and the heater to block a flow path of the resin leaked from the sliding exposed portion toward the heater.

\* \* \* \* \*